United States Patent [19]

Schäffersmann

[11] Patent Number: 5,378,952
[45] Date of Patent: Jan. 3, 1995

[54] MACHINE DRIVE SYSTEM AND METHOD

[75] Inventor: Heinz Schäffersmann, Bielefeld, Germany

[73] Assignee: ERA Electronik-Regelautomatik GmbH & Co. KG, Bielefeld, Germany

[21] Appl. No.: 899,784

[22] Filed: Jun. 17, 1992

[30] Foreign Application Priority Data

| Jun. 17, 1991 | [DE] | Germany | 4119901 |
| Jun. 17, 1991 | [DE] | Germany | 4119902 |
| Sep. 18, 1991 | [DE] | Germany | 4131048 |
| Nov. 11, 1991 | [DE] | Germany | 4137006 |
| Nov. 11, 1991 | [DE] | Germany | 4137007 |

[51] Int. Cl.$^6$ .................... H02K 11/00; H02K 3/00; H02K 3/12; H02P 1/40
[52] U.S. Cl. .................. 310/68 R; 310/179; 318/741; 318/800; 318/806
[58] Field of Search ............ 310/68 R, 166, 179; 318/756, 757, 758, 760, 766, 767, 741, 739, 772, 783, 798, 800, 806, 807; 60/908; 68/12.01, 12.02, 12.03, 12.06, 12.16, 12.23

[56] References Cited

U.S. PATENT DOCUMENTS

| 3,152,462 | 10/1964 | Elliott et al. | 68/12.06 |
| 3,260,910 | 7/1966 | Spindler | 318/226 |
| 4,023,071 | 5/1977 | Fussell | 361/111 |
| 4,081,726 | 3/1978 | Brimer et al. | 310/166 |
| 4,450,398 | 5/1984 | Bose | 318/806 |
| 4,752,707 | 6/1988 | Morrill | 310/179 |
| 4,823,065 | 4/1989 | Gousset | 318/808 |
| 4,824,132 | 4/1989 | Gritter | 318/811 |
| 4,880,391 | 11/1989 | Hurtgen | 310/71 |
| 5,006,777 | 4/1991 | Lagroe | 318/806 |
| 5,068,559 | 11/1991 | Setake et al. | 310/68 R |
| 5,194,797 | 3/1993 | Kahkipuro | 318/800 |

Primary Examiner—Steven L. Stephan
Assistant Examiner—Clayton E. LaBalle
Attorney, Agent, or Firm—Herbert Dubno

[57] ABSTRACT

A drive system for washing machines, electric vehicles or the like has its winding switched to effect speed change and an asynchronous motor operated by a frequency converter where there are more than two grooves per pole and phase with respect to the motor and the number of grooves of the rotor exceeds the number of grooves of the stator whose sheet pack is welded along the back. The windings are formed as short-pitched chord half-hole windings.

8 Claims, 3 Drawing Sheets

MACHINE DRIVE SYSTEM AND METHOD

FIELD OF THE INVENTION

My present invention relates to a machine drive system and method and, more particularly, to the operation of machines which must be driven at different speeds and with different torques. Without limitation, such machines can include washing machines, electric-powered vehicles, plants which are operated with electric motors and the like. The invention relates as well to energy conservation in the speed-control of induction motors.

BACKGROUND OF THE INVENTION

Speed control in induction motor drive systems, especially asynchronous motors, can be effected using semiconductors with certain firing characteristics. The semiconductor systems can generate a variable frequency from the alternating current network or line frequency through the intermediary of a direct-current circuit in so-called frequency-converter systems. Direct-current sources, such as batteries, may also be used as inputs for the semiconductor elements which generate the speed-control frequency of the motor.

The principle of frequency-converter motor control recognizes that with an increasing frequency there is an increasing voltage at the motor of the frequency converter system.

Losses in such systems between the network or line current source and the motor generally are a function of the magnitude of the current and can result in a motor efficiency which at low speeds can be less than 50%.

The losses can result, inter alia, from a transformation of electrical energy into mechanical energy in the motor, from losses within the motor which are current dependent and from losses in the frequency converter and the circuitry supplying the motor.

Generally the motor must operate at variable speeds including, for example, a low speed for washing which can apply for a period which is significantly longer than the relatively short time required for centrifugation in a washing machine wherein the motor must operate at high speed.

Similar speed differences are encountered in electric vehicles which must be capable of being driven at high speed and low speed.

As a consequence of losses in earlier drive systems involving asynchronous motors and converters, and as a result of the need to enable switching between higher and lower speeds and vise versa, the motors used tend to be relatively large, requiring converters of substantial size and involving high energy losses and costs.

Another drawback of earlier systems is the fact that the earlier systems produce substantial magnetic noise to the detriment of electronic equipment in the vicinity.

OBJECTS OF THE INVENTION

It is, therefore, the principal object of the present invention to provide an improved drive method in which an asynchronous motor operated by a frequency converter is employed, but drawbacks of earlier systems are avoided.

Another object of the invention is to provide an improved drive system for all kinds of electrically operated machinery capable of being driven at different speeds with different torques, which will allow reduction in motor size for a given drive capacity, reduced dimensioning of the frequency converter and reduced electrical losses and operating cost.

It is yet another object of the invention to provide a drive system especially for a washing machine which efficiently and at low operating and capital cost can provide the requisite speed changes and adjustment to torque without drawbacks suffered by earlier systems.

SUMMARY OF THE INVENTION

I have discovered that many of the drawbacks of earlier systems for driving electrical machines and, especially electrical vehicles, washing machines and the like utilizing asynchronous low-voltage motors with shunt-wound rotors and energized through frequency converters, can be obviated by providing the windings so that there are more than two grooves per pole and phase with the number of grooves of the rotor being greater than the number of grooves of the stator and by providing the winding as short-pitched chordal half-hole windings.

As will be discussed in greater detail below, this arrangement allows particularly effective switching of the windings, for example between a Y and Δ configuration for speed and load changes with diminished loss and overall lower current operations so that $I^2R$ power losses are diminished throughout the system including the frequency converter.

More particularly, the method of the invention can comprise the steps of:
(a) driving the machine with an asynchronous low-voltage induction motor having a stator and a rotor with windings provided in more than two grooves per pole and phase and with a number of rotor grooves exceeding a number of stator grooves and wherein the windings are formed an short-pitched chord half-hole windings, whereby the motor encounters within a speed range of the machine different levels of torque;
(b) energizing the motor with line current through a frequency converter; and
(c) effecting a matching of motor current with torque encountered by the motor by correspondingly switching the windings.

The windings can be switched in response to an operating program of the machine or in response to the load on the motor.

A machine drive, according to the invention, can comprise:
an asynchronous low-voltage induction motor having a stator and a rotor with windings provided in more than two grooves per pole and phase and with a number of rotor grooves exceeding a number of stator grooves and wherein the windings are formed as short-pitched chord half-hole windings, whereby the motor encounters within a speed range of the machine different levels of torque;
a frequency converter supplied with line current and connected to the motor for energizing the motor; and
means for effecting a matching of motor current with torque encountered by the motor by correspondingly switching the windings.

In a washing machine system, the drive preferably comprises:
a three-phase asynchronous induction motor having a casingless stator and a rotor with windings provided in more than two grooves per pole and phase and with a number of rotor grooves exceeding a number of stator grooves and wherein the windings are formed as short-pitched chord half-hole windings, whereby the motor encounters within a speed range of the machine different levels of torque, the stator further comprising a stack of stator sheets formed with the grooves of the stator and welded together across a back of the stack;

means connected to the motor for switching the windings for different supply voltages;

a temperature monitor within the windings;

a frequency converter connected between a line current source and the motor for energizing same at a variable frequency which can be above and below a line current frequency, the frequency converter being constructed to reverse a direction of rotation of the motor by reversing an output of the frequency converter;

means connected with the frequency converter for programming same for different accelerations and decelerations of the motor and for braking the motor through the frequency converter;

an imbalance sensor responsive to imbalance of the machine and connected to the frequency converter for varying a parameter thereof; and a double-acting filter connected between the source and the frequency converter for damping perturbations transmitted from the source to the motor and perturbations transmitted from the motor to the source.

The machine of the invention operates in a field-weakening mode when the output frequency of the converter is increased beyond the corner frequency, i.e. when the frequency increases without an increase in voltage. In this mode there is a weakening of the motor field although the speed increases. Since the power is constant, the torque delivery is reduced as speed increases. This mode is possible only with reduced countertorque, a familiar occurrence in washing machines where, with centrifugation, there is a reduction in the rotated mass with time.

Surprisingly, I have found that a machine of the foregoing construction eliminates at least some of the drawbacks of earlier washing machines for household and commercial use and for centrifugation and drying, e.g. for commercial and industrial use and for textile treatments and using an asynchronous motor and a frequency converter as the energy source.

Those earlier machines were unsatisfactory in one or more of the following points:

(a) They were insufficiently quiet in operation and thus represented a drawback in hospitals, hotels and multifamily dwellings.

(b) The efficiency was poor and the machine drive design did not allow significant energy conservation.

(c) The machines were insufficiently reliable and required substantial maintenance.

(d) They contributed noise to the power supply network and thus had a detrimental effect on video reception, data processing systems, medical instruments and apparatus and the like.

(e) The operating and capital costs were unsatisfactory since generally the motor had to be overdimensioned and replacement and repair were expensive.

(f) There were limitations in the operations of such machines in terms of critical speeds which could not be sustained, torques which could not be delivered and repair costs were high as were energy costs.

By comparison with these earlier systems, the motor of the invention allows a washing machine to be operated with high reliability practically at all voltages and frequencies between zero and the nominal voltage and frequencies between zero and about 200 Hz. In practice it has been found that the motor of the invention, when operated with the system, provides substantially less magnetic noise, is free from the limits on machine operations of earlier systems, can allow the motor to operate at all speeds, accelerations and decelerations of the motor with minimum magnetization, eliminates the losses hitherto encountered because of the need for extensive chokes and the like and, in general, permits the motor to be smaller, the frequency converter to be smaller and the overall system greatly downsized by comparison to earlier systems.

Another aspect of the invention relates to the design of the motor or system to optimize the operation thereof in accordance with the principles stated above.

I have found, for example, that for optimum operation of the system, especially as a drive unit for a washing machine, the motor should be so constructed that the ratio of its maximum frequency to the corner or break frequency should be equal to the reciprocal of the ratio of the load torque at the lower speed range to the load torque at the upper speed range. The corner or break frequency is the frequency at which the maximum voltage is reached and beyond which with further increase in the frequency as applied by the frequency converter, there is no further increase of the motor voltage. This corner frequency is, therefore, a calculated value serving as a design factor for the motor windings.

To understand the significance of this point, it should be mentioned that in the state of the art in which motors are driven by the standard frequency of the supply source or lines network, a Y to Δ switching of the windings is utilized to achieve a power and speed increase of 73% ($\sqrt{3}$).

With the system of the invention, such switching is employed to switch speeds and, in addition, the corner frequency is determined by the relationship:

$$\frac{fm}{fc} = \frac{THS}{TLS}$$

where fm is the maximum frequency, fc is the corner frequency, THS is the load torque in the high-speed range and TLS is the load torque at the load frequency. The result is a motor operating with minimum energy demand and maximum efficiency for the motor size.

According to another feature of the invention, the frequency converter setting establishes a corner frequency which differs from the design corner frequency substantially more than the usual nominal voltage tolerances. This, as will be described below in greater detail, leads to a double reduction of the energy consumption and allows smaller rotor dimensions to be used, although reducing the fabrication cost of the motor.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
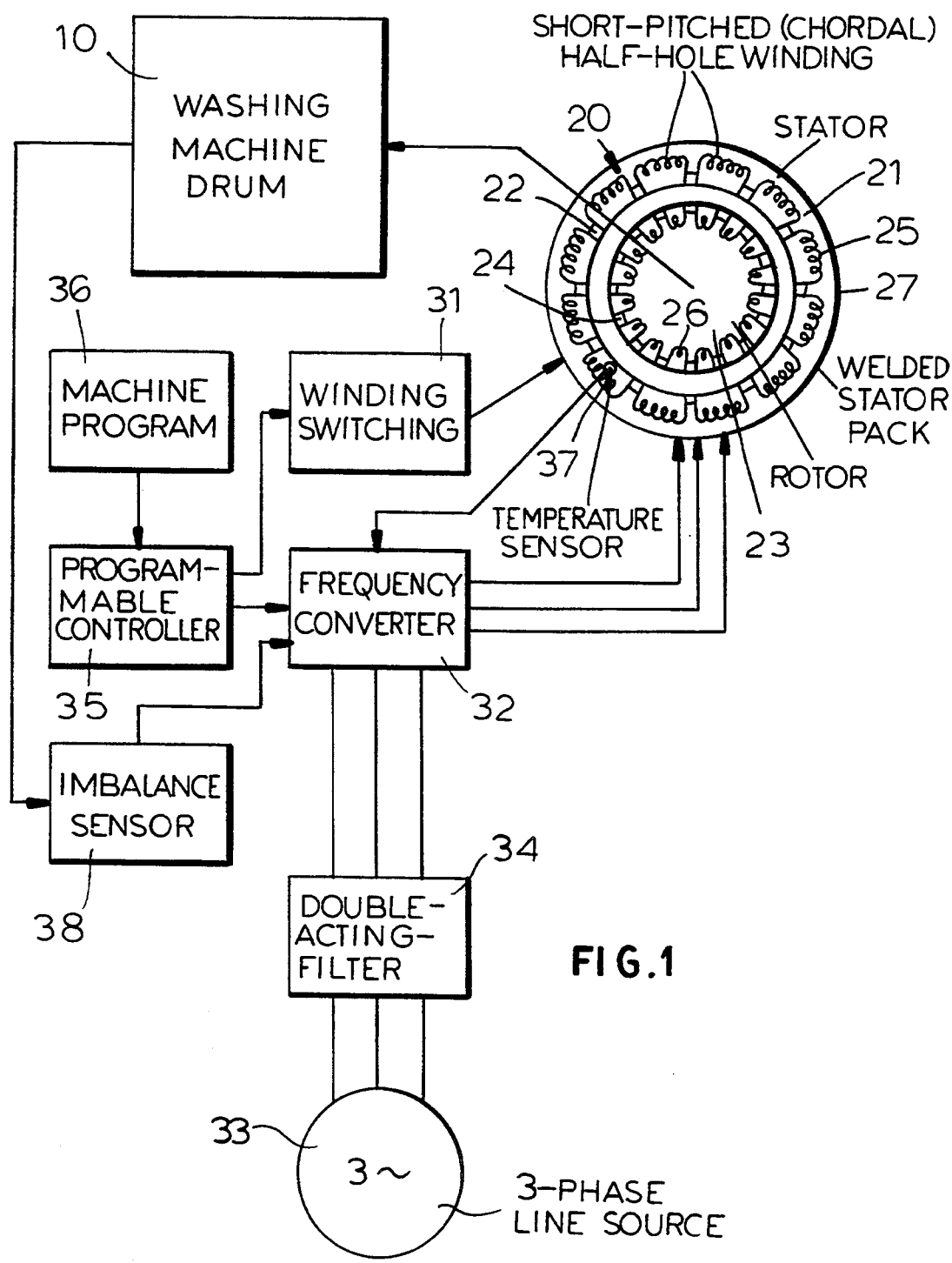
FIG. 1 is a block diagram illustrating a system in accordance with the present invention.

FIG. 1 shows a washing machine drive in which a washing machine drum 10 is driven by a motor 20 at high speed and at low speed controlled by winding switching between Y and Δ connections as represented by the winding switching circuit 31.

The motor 20 is energized by a frequency converter 32 from the three-phase line source 33 via a double-acting filter 34 intended to filter perturbations (noise) from the line current supplied to the frequency converter and thus to the motor and, in addition, to remove noise which might be fed back to the network or line.

The frequency converter 32 is programmable as represented by the programmable controller 35 which can also operate the winding switch 31 for the various stages in the machine program. The programmable controller can have an appropriately programmed memory which can be activated by a machine program which can be set by the user and as represented at 36. A temperature sensor 37 in the windings of the motor can provide an input to the frequency converter to alter the output parameters thereof and an imbalance sensor 38 can be provided for the machine structure or drum 10 also to modify the converter parameters, e.g. by slowing down the motor when an imbalance in the drum is detected.

As can be seen diagrammatically from FIG. 1, the stator 21 can be provided with a lesser number of grooves 22 than the rotor 23 whose grooves are shown at 24. The windings of the stator and rotor have been represented at 25 and 26, respectively. The stator can be composed of stator sheets as is conventional to form a stator pack, the sheets being welded together along the back of the stator at 27 and the motor is thus constituted as a casing-free motor which does not require any external housing.

As a consequence the system comprises the three-phase asynchronous motor 20 with a number of grooves which exceeds two grooves per pole and phase, the motor has a rotor groove number which is greater than the stator groove number, the sheets of the stator stack are welded together along the back of the stator pack and the stator is not built into any housing, the motor has short-pitched or chordal half-hole windings, the windings of the motor are switchable for various voltages and within the motor coil a temperature monitor is provided.

In addition, the motor is energized via the frequency converter 32 whose output frequency, corresponding to the drive requirements, can lie above or below the network or source frequency and the switchover in the direction of rotation can be effected by a switchover of the outputs of the frequency converter.

The frequency converter 32 can receive different programs from the controller 35 for the different acceleration and deceleration stages required for the machine operation and the braking of the machine can be effected with the aid of the frequency converter. The motor can be operated in part in a field-weakening operating mode and the switching of the programming of the frequency converter via the programmable controller can be effected by the machine programmer 36 which can turn on and off the programming.

As has already been noted, an imbalance sensor can be used to control parameters of the frequency converter and the double-acting filter 34 can protect the motor from perturbations in the network or source and can prevent transmission of noise to the network.

Figure 2:
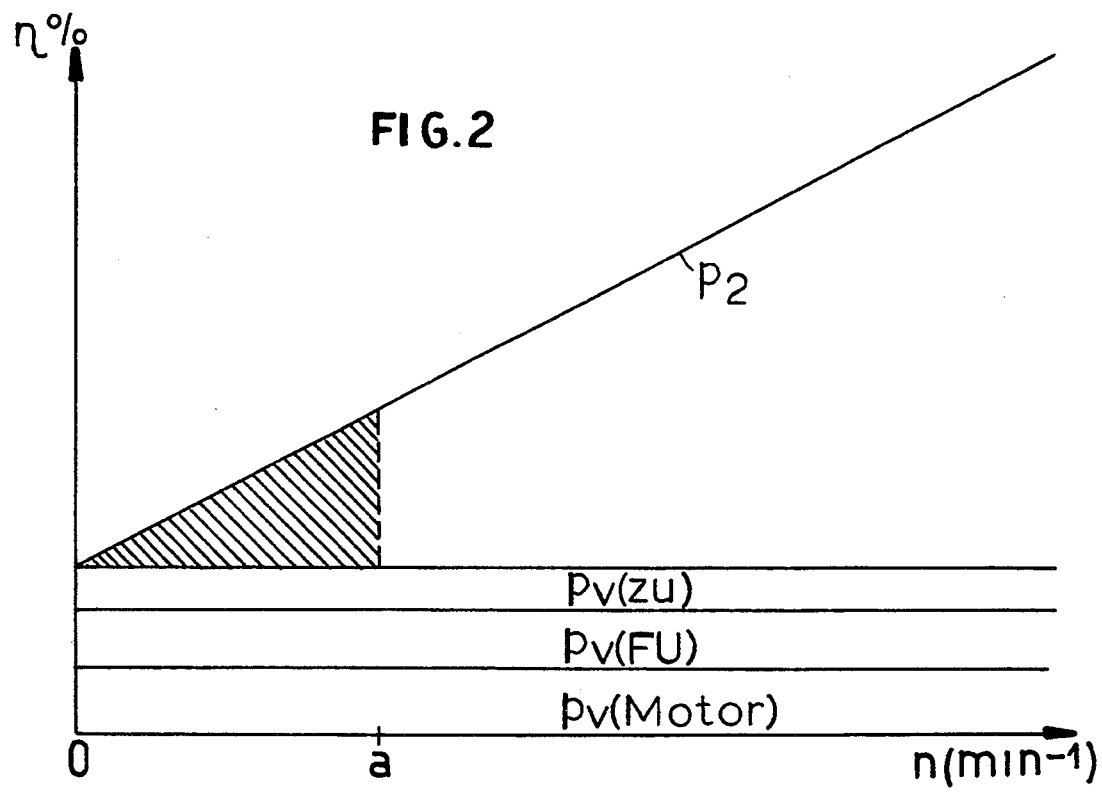
FIGS. 2 and 3 are graphs of efficiency versus speed, illustrating principles of the invention.
Figure 3:
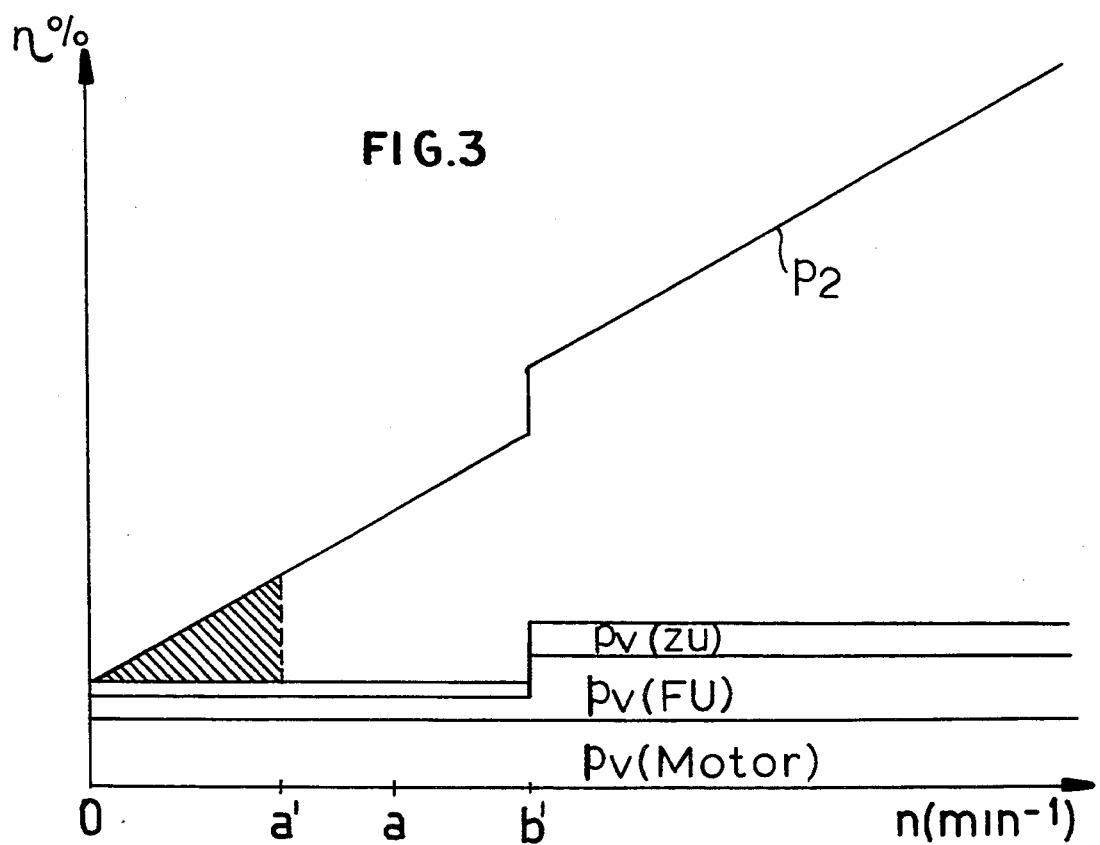

Some of the principles under which the invention operates can be seen from FIGS. 2 and 3.

FIG. 2 is a diagram of the efficiency plotted along the ordinate versus motor speed plotted along the abscissa showing the output power $P_2$ and the power losses where $P_v$ (motor) equals motor loss, $P_v$ (FU) represents frequency converter loss and $P_v$ (zu) represents additional losses in the circuitry, wiring, cooling, etc.

FIG. 3 shows the same losses and is a similar graph but shows the state in which the system is operated with half the current but twice the voltage after start-up under the same conditions as in FIG. 2.

With the system of the invention, with such switching to higher frequency and thus higher voltage, thereby allowing a reduction in the current, a smaller frequency converter can be used and any requisite chokes and smoothing circuitry can be smaller. In some cases, separate cooling of the frequency converter can be avoided.

The space required for the circuitry is less and temperature dependency also becomes a smaller factor. Power lines can be lighter, the weight of the power electronics can be reduced, circuitry closets can be smaller and it may be possible to avoid the need for air-conditioning in the spaces in which the equipment is provided.

When the principles are applied to battery-driven vehicles, the radius of operation can be greater. The transmission of switching spikes to the current supply network is eliminated and, when the drive is used in a washing machine, it can be employed effectively in households, hotels and hospitals.

The circuitry costs can be minimized since the winding switching can coincide with the switching required from washing to centrifugation, for example, and from very low speed city travel to higher-speed country travel in the case of a vehicle.

Figure 4:
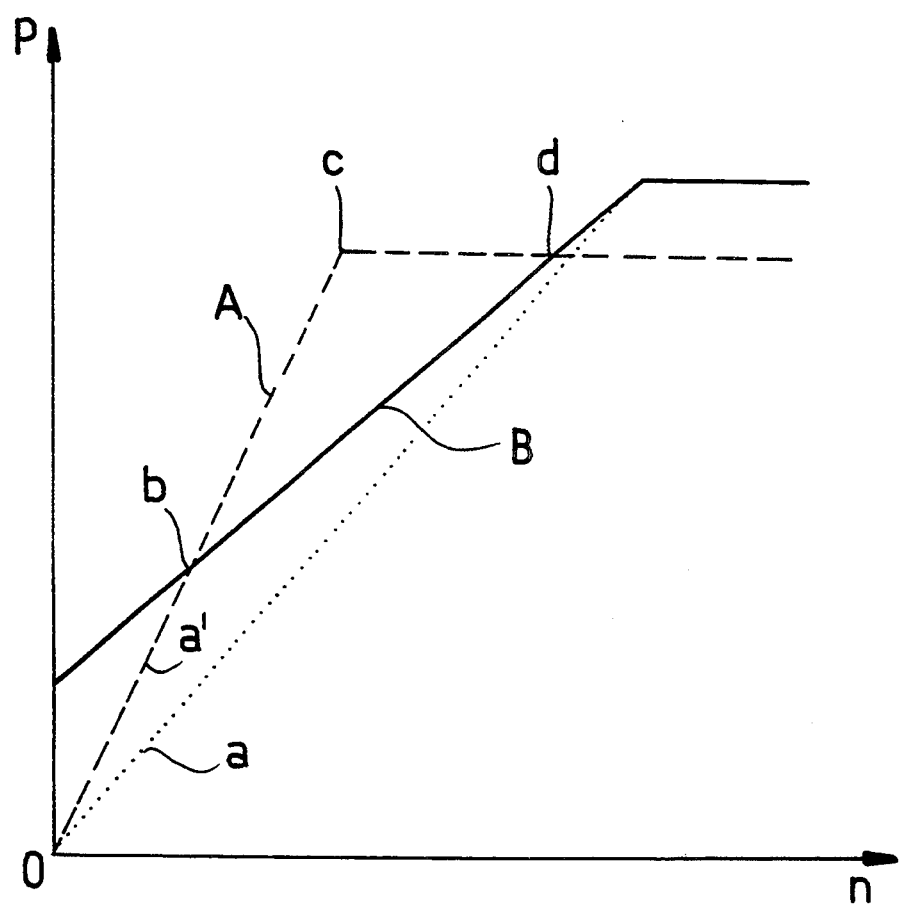
FIG. 4 is a graphic diagram of power versus speed, illustrating design criteria of the invention.

FIG. 4 is illustrative of the design criteria mentioned above. It is important, as the previous discussion shows, to reduce the current and operate at the higher voltage so that $I^2R$ losses are greatly reduced. For operations at low speeds and low frequencies, the voltage should be higher and the current low since the current which must be handled determines the size of the frequency converter.

In FIG. 4 I have shown the design graph A for a motor, this curve representing the curve of power versus speed with an increase in frequency to the point c which is the break frequency or corner frequency described above.

According to the invention, the energy is supplied by the programmed frequency converter along the curve B. The triangle within the points b, c and d is not used. The advantage lies in the increase in power between a and a' and in the reduction of the current for motor and frequency converter. The power increase is used to enable motors of smaller size to be employed, so that upon a reversing operation during washing, for example, the intrinsic inertia of the motor can be reduced. This gives rise to a two-fold reduction in the energy demand, firstly because of an improved efficiency of the motor and secondly by the reduced mass which must be accelerated.

By way of example, for the improved washing machine drive, I can provide a 6-pole motor with a maximum speed of 4000 min. The number of grooves of the rotor can be (6 poles.3 phases.3 grooves per pole per phase) 54 and, as noted, the stator can have fewer grooves.

I claim:

1. A method of regulating a speed of a machine, comprising the steps of:
   (a) driving said machine with an asynchronous low-voltage induction motor having an operating frequency corresponding to design corner frequency corresponding, in turn, to a break point on a graph of power against speed of said motor;
   (b) providing a stator and a rotor with windings in more than two grooves per pole and phase and with a number of rotor grooves exceeding a number of stator grooves whereby said motor encounters within a speed range of the machine different levels of torque;
   (c) energizing said motor with line current through a frequency converter having an output frequency;
   (d) increasing the output frequency of the converter beyond the design corner frequency and driving the motor at said output frequency beyond the design frequency, thereby increasing the speed of the motor while decreasing the torque delivery; and
   (e) effecting a matching of motor current with torque encountered by said motor by correspondingly switching said windings.

2. The method defined in claim 1 wherein said windings are switched in response to an operating program of said machine.

3. The method defined in claim 1 wherein said windings are switched in response to a load on said motor.

4. The method defined in claim 1 wherein said step (a) including the step of selecting said design corner frequency such that a ratio of a maximum output frequency of operation of said motor to said corner frequency is equal to the reciprocal ratio of said load torque at the lower speed range to the load torque at the higher speed range.

5. A drive for a machine, comprising:
   an asynchronous low-voltage induction motor having a stator and a rotor with windings designed to operate at operating frequency corresponding to a design corner frequency corresponding, in turn, to a break point on a graph of power against speed of said motor, said windings being provided in more than two grooves per pole and phase and with a number of rotor grooves exceeding a number of stator grooves, whereby said motor encounters within a speed range of the machine different levels of torque;
   a frequency converter supplied with line current and connected to said motor for energizing said motor beyond said design frequency, the maximum voltage of the motor being reached at said design frequency and not further amplifying upon subsequent augmenting of an output frequency of the converter; and
   means for effecting a matching of motor current with torque encountered by said motor by correspondingly switching said windings.

6. A washing machine drive, comprising:
   a three-phase asynchronous induction motor having a casingless stator and a rotor with windings provided in more than two grooves per pole and phase and with a number of rotor grooves exceeding a number of stator grooves, whereby said motor encounters within a speed range of the machine different levels of torque, said stator further comprising a stack of stator sheets formed with the grooves of the stator and welded together across a back of the stack, said motor having an operating frequency corresponding to a design corner frequency corresponding, in turn, to a break point on a graph of power against speed of said motor;
   means connected to said motor for switching said windings for different supply voltages;
   a temperature monitor within said windings;
   a frequency converter connected between a line current source and said motor for energizing same at a variable frequency which can be above and below a line current frequency, said frequency converter being constructed to reverse a direction of rotation of said motor by reversing an output of said frequency converter, the maximum voltage of the motor being reached at said design frequency and not further amplifying upon subsequent augmenting of the frequency of the converter;
   means connected with said frequency converter for programming same for different accelerations and decelerations of said motor and for driving said motor through said frequency converter;
   an imbalance sensor responsive to imbalance of said machine and connected to said frequency converter for varying a parameter thereof; and
   a double-acting filter connected between said source and said frequency converter for damping perturbations transmitted from said source to said motor and perturbations transmitted from said motor to said source.

7. The washing machine drive defined in claim 6 wherein said design corner frequency is selected such that a ratio of a maximum output frequency of operation of said motor to said corner frequency is equal to the reciprocal ratio of said load torque at the lower speed range to the load torque at the higher speed range.

8. The washing machine drive defined in claim 6 wherein said frequency converter is set for a corner frequency offset from the design corner frequency of said motor by an amount greater than nominal voltage of said frequency converter.

* * * * *